(12) United States Patent
Linjama

(10) Patent No.: US 6,270,039 B1
(45) Date of Patent: Aug. 7, 2001

(54) HINGE FOR MOVABLE CONTROL SURFACES IN AN AIRCRAFT AND A CONNECTING PIECE TO BE USED WITH SUCH A HINGE

(75) Inventor: Jussi Linjama, Colomiers (FR)

(73) Assignee: Patria Finavicomp Oy, Halli (FI)

( * ) Notice: Subject to any disclaimer, the term of this patent is extended or adjusted under 35 U.S.C. 154(b) by 0 days.

(21) Appl. No.: 09/416,622

(22) Filed: Oct. 12, 1999

(51) Int. Cl.$^7$ ....................................................... B64C 3/38
(52) U.S. Cl. ........................ 244/213; 244/215; 244/75 R; 244/131
(58) Field of Search .................................. 244/75 R, 131, 244/213, 214, 215, 216, 123; 74/96

(56) References Cited

U.S. PATENT DOCUMENTS

| | | | |
|---|---|---|---|
| 2,246,116 | * | 6/1941 | Wagner et al. ........................ 244/216 |
| 2,779,555 | * | 1/1957 | Danielson ............................. 244/216 |
| 3,140,066 | * | 7/1964 | Sutton et al. ........................ 244/215 |
| 3,756,089 | * | 9/1973 | Haladay ................................... 74/96 |
| 5,098,043 | * | 3/1992 | Arena .................................... 244/215 |
| 5,836,550 | * | 11/1998 | Paez ..................................... 244/216 |

* cited by examiner

Primary Examiner—Galen L. Barefoot
(74) Attorney, Agent, or Firm—Ladas & Parry

(57) ABSTRACT

The invention relates to a hinge for movable control surfaces in an aircraft. The hinge comprises two hinge lugs placed at a distance from one another. The hinge lugs include connecting lugs with an elongated connecting piece therebetween. An actuator is connected to the connecting piece conveying the force by means of fastening lugs to the hinge and further onto the control surface. The connecting piece is pivoted to the connecting lugs so that it can revolve about its longitudinal axis when moving the control surface.

The invention also relates to a connecting piece intended to be used with a hinge like the one described above. The connecting piece is an elongated element including journals at both ends from where the connecting piece is rotatably pivoted about its longitudinal axis between the connecting lugs on the hinge. A middle portion of the connecting piece between the journals is flat and tapers towards the journals.

6 Claims, 4 Drawing Sheets

HINGE FOR MOVABLE CONTROL SURFACES IN AN AIRCRAFT AND A CONNECTING PIECE TO BE USED WITH SUCH A HINGE

BACKGROUND OF THE INVENTION

1. Field of the Invention

The invention relates to a hinge for movable control surfaces in an aircraft.

The invention further relates to a connecting piece intended to convey the force needed for moving a control surface of an aircraft from an actuator to a hinge.

2. Description of the Prior Art

In aircrafts, such as aeroplanes, various movable control surfaces are used for piloting the aircrafts and for controlling different flight operations, such as take-offs and landings. Examples of such movable control surfaces are ailerons, elevators rudders and different airbrakes and flaps. In addition, aeroplanes use spoilers arranged on the upper surface of the wings, which remove the lift caused by the wings when the aeroplane is descending or landing. Spoilers can also be used during the flight to maneuver the aircraft FIG. 1 illustrates such a spoiler. FIG. 2 further shows a hinge us with the spoiler. In relation to the hinge the spoiler can be moved upwards and downwards with a hydraulic cylinder in relation to the wing. Since high reliability and fall safe solutions are required in aircrafts, there are generally at least six hinge lugs for each control surface. Typically the two middlemost hinge lugs form an entity which is referred to as a middle hinge. The middle hinge further comprises connecting elements used to arrange the hydraulic cylinder or an equivalent actuator to move the control surface with the hinge. The force, up to 50 t, moving the control surface provided by the actuator is thus conveyed using the middle hinge to the control surface. The problem with prior art solutions is the heavy weight used by the massive structure of the middle hinge. Furthermore, in order for the middle hinge to be supported on the control surface, the control surface has to be made firm, and heavy at the same time. However, lightness together with reliability is one of the most important criteria in aircraft constructions.

SUMMARY OF THE INVENTION

It is an object of the present invention to provide a, hinge arrangement of aircraft control surfaces that avoids prior art problems.

A hinge according to the invention is characterized in that the hinge comprises two hinge lugs arranged on the control surface at a predetermined distance from each other by means of joint surfaces in the hinge lugs, the hinge lugs comprising fastening lugs which can be connected to the aircraft with hinge pins or the likes the hinge lugs comprising connecting lugs between which an elongated connecting piece is arranged, the ends of the connecting piece including journals from where the connecting piece is pivoted to the connecting lugs rotatably about its longitudinal axis, and a middle portion between the journals of the connecting piece being flat so that the middle portion is thicker in the direction of the force conveyed from the actuator than in the transversal direction of the force, and the connecting piece comprising means for connecting the actuator, whereby the actuator can be used for turning the control surface in relation to said hinge pins, and wherein the connecting piece is arranged to simultaneously revolve about its longitudinal axis when turning the control surface.

A connecting piece of the invention is further characterized in that the connecting piece is an elongated element comprising journals at both ends, from where it can be rotatably pivoted about is longitudinal axis between the connecting lugs on the control surface hinge, and a middle portion between the journals of the connecting piece being plate-like and tapering towards the journals, and the middle portion of the connecting piece comprising means for connecting the actuator to the connecting piece.

An essential idea of the invention is that a hinge to be attached to a movable control surface comprises two hinge lugs arranged at a predetermined distance from each other. The hinge lugs include fastening lugs from where they are hinged with hinge pins or the like to the lugs arranged to an aircraft. Furthermore, both hinge lugs comprise a connecting lug, whereby an elongated connecting piece is rotatably pivoted about its longitudinal axis between said lugs, the ends of the connecting piece including pivoting journals. The force using the control surface is conveyed from the actuator to the hinge with a connecting piece. The connecting piece is able to revolve about its lontgitudinal aids, when the control surface is moved. An essential idea of a preferred embodiment of the invention is that the hinge comprises two separate hinge lugs arranged at a predetermined distance from one another. Me hinge lugs comprise fastening lugs, from where they are both separately hinged to the lugs stationarily arranged to the aircraft using hinge pins. Both hinge lugs also comprise a connecting lug, whereby a connecting piece is rotatably pivoted about its longitudinal axis between said lugs. A further essential idea of a second preferred embodiment of the invention is that there is an elliptic flat middle portion between the journals of the connecting piece. The middle point of the connecting piece may comprise a transverse connecting hole, to which a fastening element provided with a branch-like end connected to the actuator can be attached with a mate pin. The flat middle portion of the connecting piece, can then be fitted between the branches of the fastening element. As the connecting piece may revolve when the control surface is moved, the connecting piece always remains in the predetermined position in relation to the direction of the force provided by the actuator and thus the bend is directed towards the connecting piece only in the direction of movement of the power unit. The connecting piece is particularly designed to receive the bend in said direction. A further essential idea of a third preferred embodiment of the invention is that the fastening lug and the connecting lug are substantially arranged in the same fine in the direction of the force provided by the actuator. The fastening lug and the connecting lug are preferably in the same lug and form an integral structure. Another essential idea of a; fourth preferred embodiment of the invention is that ball joints or corresponding bearings that allow an angle position change between the connecting piece and the connecting lug are arranged at both ends of the connecting piece, whereby the possible bend of the connecting piece does not cause torque to the connecting lug.

An advantage of the invention is that the forces are divided into a larger surface area, as the hinge lugs are arranged further apart from one another. Local loads at the fastening points of the hinge remain lighter and a higher reliability is achieved, On the other hand, reduced loading, allows to reduce the weight of the structures. Thinner surface plates may thus be employed on the control surfaces. Furthermore, the actual hinge is on account of its construction lighter than the massive integrated prior art hinges. According to surveys conducted the new hinge easily provides a 30% reduction in weight compared to the prior art construction. A similar reduction in weight is hard to achieve merely by providing a lighter control surface structure. This is difficult because attempts have already been made to optimize the relation between the stiffness and the weight of the control surfaces in current structures by using, for example, light cell structures and reinforcements, such as carbon fibre. Although the new hinge structure is significantly lighter than the previous ones, It is still at least as steady and reliable as prior art structures. In addition, the maintenance is made easier since separate hinge lugs can be detached irrespective of each other.

When the connecting piece is journalled between the connecting, lugs using ball joints or corresponding bearing elements, no torsional/bending load from the possible bend of the connecting piece is conveyed to the hinge lugs nor to the joint surface between the hinge lug and the movable control surface. Compared to prior art solutions a part of the load acting on the hinge can thus be completely avoided. As to the loads it is also preferable that the fastening lug and the connecting lug are arranged substantially in the same line in relation to the force conveyed from the actuator. In this way, the bending/torsional loads in the area between the fastening lug and the connecting lug can be avoided. Since the loads acting on the hinge lugs can now be controlled better than before, the structure of the hinge lugs can be made much lighter. Furthermore, if joints that allow angle changes between the connecting piece and the connecting lug are used, then the possible bend of the connecting piece does not provide any forces to the hinge lugs. The bend of the connecting piece does not cause any supplementary stress to the control surface structure in the area between the hinge lugs, and the structure of the control surface can therefore be made lighter than before.

Here, a movable control surface refers, for instance, to spoilers, flaps, airbrakes, elevators and rudders, as well as other possible elements to be moved by an actuator regarding the hinging used for piloting and controlling an aircraft. An aircraft here refers to various aeroplanes, airships, satellites, spacecrafts and to other possible equipment moving in the, air and controlled by the control surfaces moved by the actuator.

BRIEF DESCRIPTION OF THE DRAWINGS

The invention will be explained greater detail in the attached drawings, in which.

DETAILED DESCRIPTION OF THE INVENTION

Figure 1:
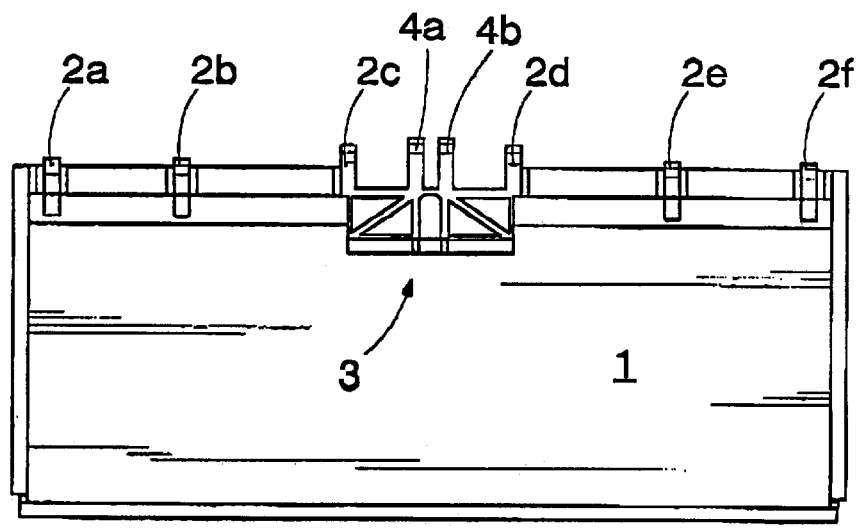
FIG. 1 shows a bottom view of a prior art spoiler

FIG. 1 is a simplified view of an aileron hinged in accordance with prior art. The forward edge of an aileron 1 comprises hinge lugs 2a–2f for hinging the aileron to the lugs on the wing. The aileron can then be moved in relation to the hinges by using an appropriate actuator, usually a hydraulic cylinder. Typically the two innermost hinges 2c and 2d are integrated, in which case they form a middle hinge 3. The middle hinge comprises another set of lugs 4a and 4b between the lugs 2c and 2d for connecting the actuator. The end of the piston rod of the hydraulic cylinder generally comprises an eye joint which is connected to the hinge with an axis which is arranged to the holes in the lugs 4a and 4b and through the eye.

Figure 2:
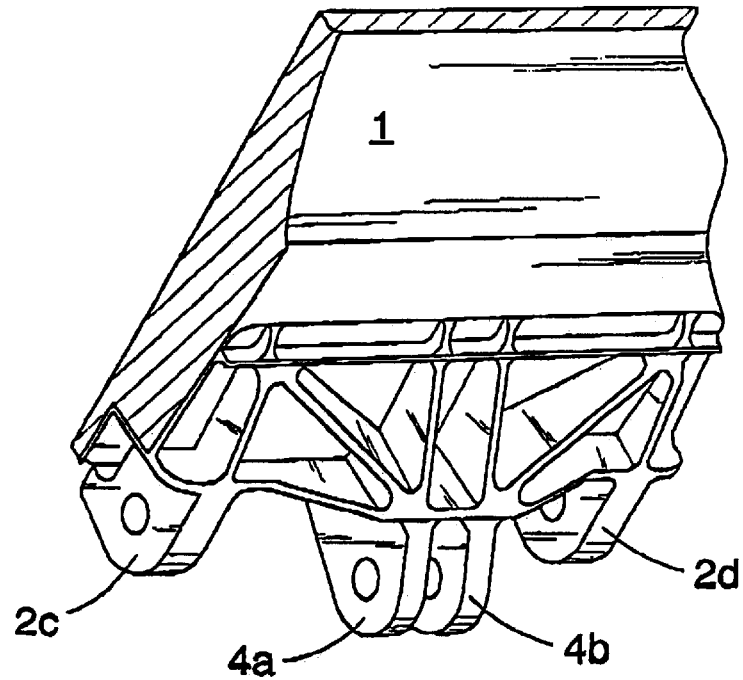
FIG. 2 shows a prior art hinge of a movable control surface.

FIG. 2 shows a prior art middle hinge in perspective. The hinge comprises lugs 2c and 2d including holes for a hinge pin. The hinge pin rotatably connects the hinge portion attached to the aileron to the hinge portion fixed attached to the aircraft. The hinge also comprises lugs 4a and 4b including holes so that an axis connecting the lugs to the loop-like connecting piece of the actuator can be arranged through the holes. The hinge pins and the axis connecting the actuator are arranged at a predetermined distance from one another, in which case the force provided by the actuator causes torque, which moves the control surface to a desired direction in relation to the hinge, and also keeps the control surface in the desired position despite the forces acting thereupon.

Figure 3A:
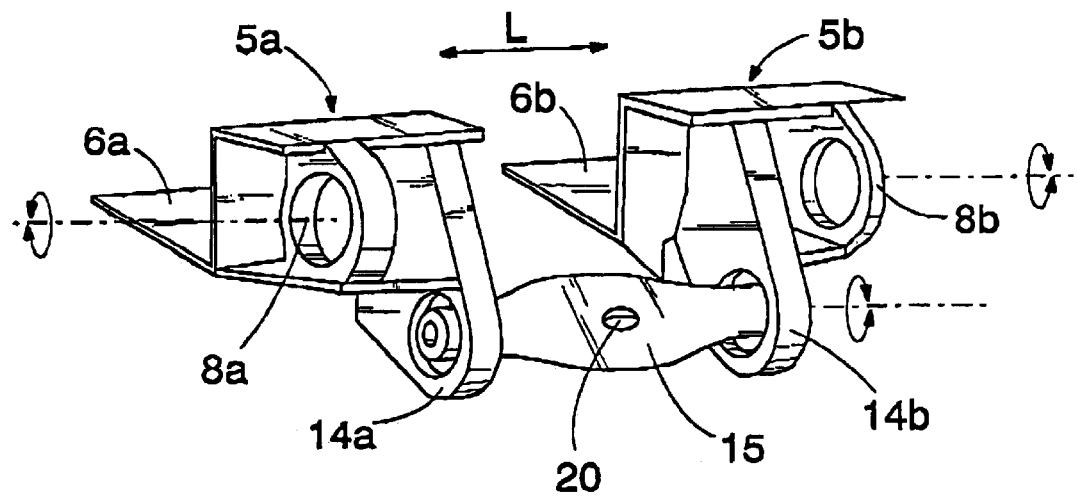
FIG. 3a schematicaliy shows a perspective view of a hinge arrangement of the control surface according to the invention and FIG. 3b correspondingly shows a top view of the same.
Figure 3B:
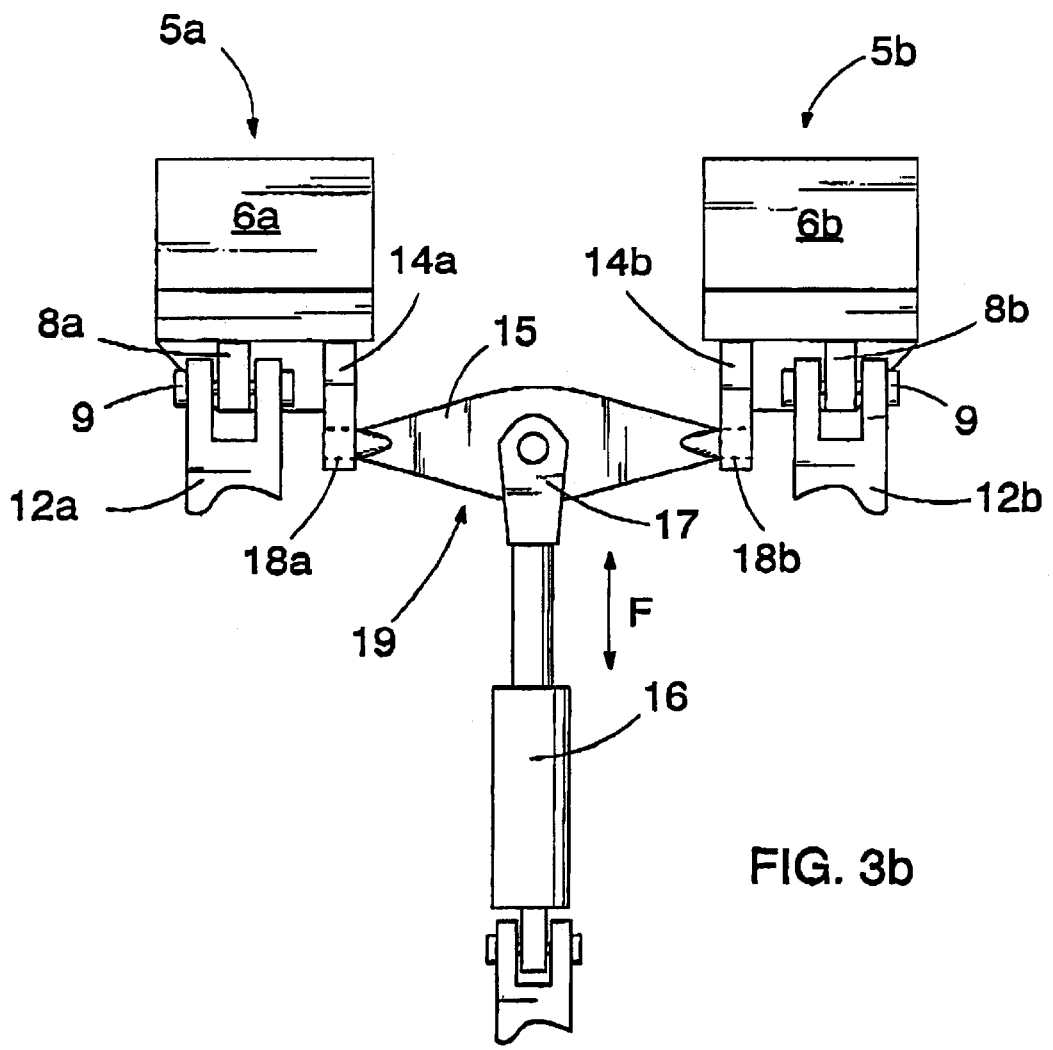

FIG. 3a is a simple perspective view showing a hinge portion of the invention to be arranged on the control surface. A top view of such a hinge is shown in FIG. 3b. The hinge comprises two separate hinge lugs, a first hinge lug so and a second hinge lug 5b. The hinge lugs can be attached using joint surfaces 6a and 6b thereof to the control surface structure, at a predetermined distance L from one another. The hinge lugs can thus be arranged further apart from each other compared to prior arts in which case the force to be conveyed from the actuator to the control surface using the hinge is divided into a larger area and local stress remain lower. The hinge lugs comprise fastening lugs 8a and 8b including holes for a hinge pin 9. The hinge pin rotatably connects the hinge portion attached to the control surface to the fixed hinge portion arranged to the craft. The fixed hinge portion comprises branch-like lugs 12a and 12b parallel to the rotatable hinge portion lug. The branch-like lugs include holes for the hinge pin and also a joint surface or the like, from where the fixed hinge portion is attached to the aircraft. Depending on the kind of control surface concerned the fixed hinge portion is arranged to the fuse lage, wing, vertical stabilizer or horizontal stabilizer construction of the aircraft or to another fastening part. Furthermore, the hinge lugs comprise connecting lugs 14a and 14b including connecting holes for a connecting piece 15 to be arranged between the hinge lugs. It should be noted that for reasons of clarity FIGS. 3a and 3b do not illustrate any bearings, by which the connecting piece and correspondingly the hinge pins are pivoted to the lugs thereof. It is preferable to use appropriate roller bearings, such as cylinder bearings.

The force needed for moving the control surface is conveyed to the hinge using the connecting piece and further to the control surface using the hinge. The control surface is preferably moved with a hydraulic cylinder 16, at the piston rod end of which a fastening element 17 is arranged which allows to attach it to the connecting piece 15. There are of course other actuators, such as hydraulic and electric motors, which can be used for moving the control surface.

Figure 4A:
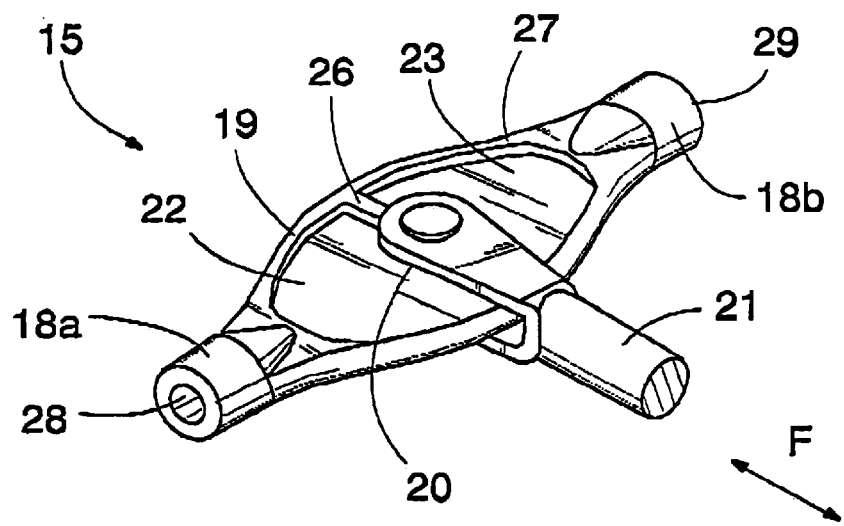
FIGS. 4a–4c schematically show three different views of a connecting piece of the hinge according to the invention, and FIG. 5 schematically shows a hinge lug of the hinge according to the invention.
Figure 4B:
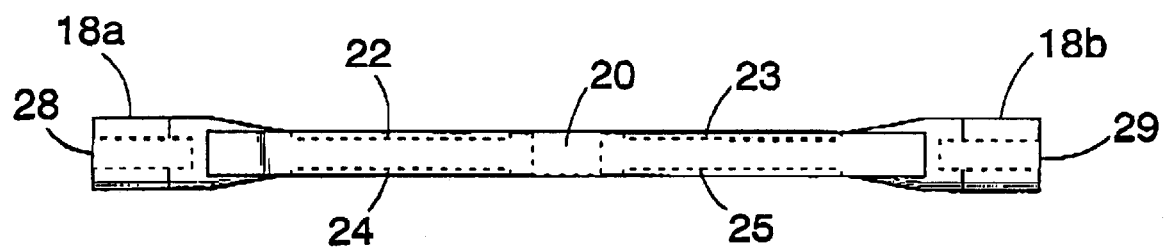
Figure 4C:
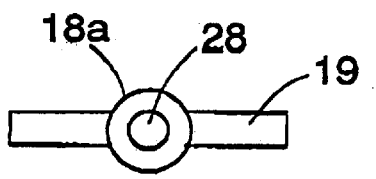

FIG. 4a is a perspective view showing a connecting piece of the invention. FIG. 4b is a side view and FIG. 4c is an end view of the same. At both ends the connecting piece 16 comprises journals 18a and 18b, from where it can be pivoted rotatably about its longitudinal axis between the fastening lugs included in the hinge. A middle portion 19 between the journals is preferably flat, i.e. the middle portion is thicker in the direction of the force arriving from the actuator than in the transverse direction of the force. The shape of the middle portion is preferably elliptic. The connecting piece can also be differently shaped, like a plate-like piece tapering at the ends. Since the shape of the connecting piece provides a very good relation between stiffness and weight for the connecting piece, it can be made rather long. The hinge lugs can thus be arranged far apart from one another, without the hinge weight increasing too much on account of the long connecting piece. The connecting piece includes, preferably in the middle, a transversal hole 20 substantially perpendicularly regarding the substantially planar surface of the middle portion. Such a joint between the connecting piece and a fastening element 21 connected to the actuator enables the parts to be rapidly detached and changed, for example, during servicing. Because of the shape of the connecting piece the thickness of the material is greatest in the middle of the connecting piece in the direction of force F arriving from the power unit A structure thus designed is very stiff regarding the bends, caused by the push and pull of the power unit. However, at the same time the structure is light, as the thickness of the material diminishes towards the journals. Since mainly shear force is acting on the ends of the connecting piece, a smaller amount of material is sufficient in said parts. The thickness of the plate-like middle portion of the connecting piece does not need to be very large, as the connecting piece can revolve when moving the control surface around its longitudinal axis, in which case mainly only bend in the direction of motion F of the piston rod of the hydraulic cylinder using the control surface is acting on the connecting piece. In order to reduce weight, recesses 22–25 can be formed on the upper and/or lower surfaces of the connecting piece. The connecting, hole preferably comprises a reinforcement 26 transversal to the connecting piece, and an edge stiffening 27 winds at the edges of the connecting piece, both reinforcing the structure. The weight of the connecting piece can be further reduced by prodding drillings, or bind holes 28 and 29, at the journals, in which case the cross-section of the connecting piece at the journals is circular. The connecting piece is preferably made by forging but it may also be casted.

For connecting the actuator the connecting piece may alternatively comprise a transversal hole, which is parallel to the substantially planar surface of the middle portion, i.e. transversal in relation to the hole shown in the Figure. A fastening element penetrating the connecting piece is then arranged to the extension of the piston rod of the hydraulic cylinder. The fastening element may comprise a shoulder which allows to push with the hydraulic cylinder and correspondingly on the other side of the connecting piece a locking nut, in which case the hydraulic cylinder can be used for pulling from the connecting piece. The joint between the connecting piece and the actuator can also be arranged, for example, by means of a band arranged around the connecting piece, or the fastening element can be attached to the connecting piece, for example, with screw or rivets.

Figure 5:
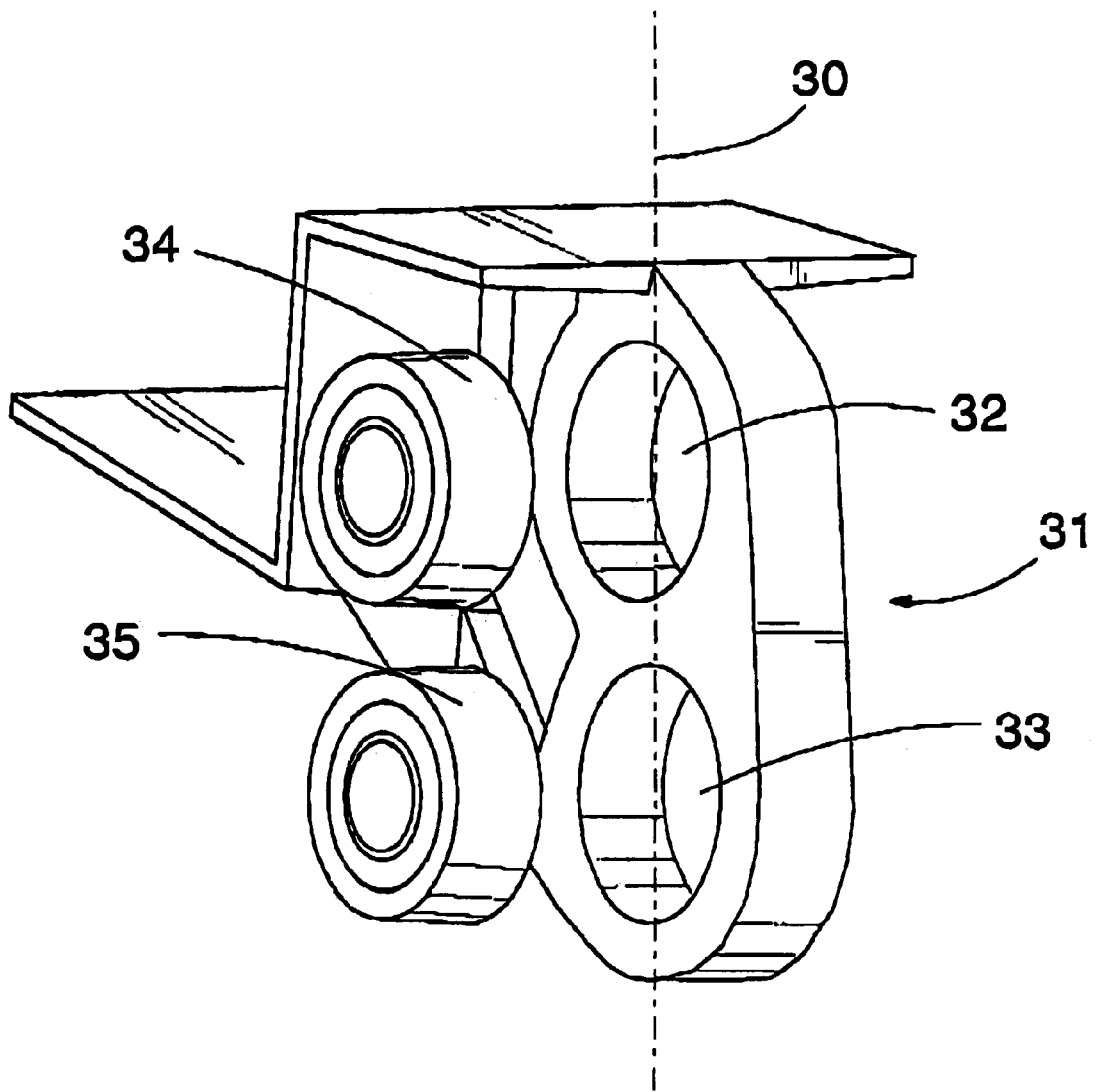

FIG. 5 is a perspective view showing a hinge lug which is applicable with the hinge of the invention. Deviating from the solution shown in FIGS. 3a and 3b the connecting lug and fastening lug now form an integral structure, whereby the connecting lug and fastening lug are in the same line in relation to the force directed from the actuator, the line being illustrated with a dot-and-dash line 30 in the Figure. Moving the control surface does not cause substantial torsion/bending lads to such a hinge lug. Furthermore, such a construction is now easier to manufacture, as only one lug 31 is needed, Into which holes 32 and 33 are made in order to connect the connecting piece and the hinge pin. The Figure also shows bearing elements 34 and 35 of the conning piece and the hinge pin.

The drawings and the description thereof are merely intended to illustrate the idea of the invention. The details of the invention may vary within the scope of the claims. The control surface may therefore comprise several hinges according to the invention, in which case multiple actuators are used to move the control surface. Even though the hinge of the invention is particularly well-suited to be used as a middle hinge of the control surface, the control surface may in some cases be hinged by employing only one or more hinges of the invention. Furthermore, even though the Figures and the description present hinges that consist of two separate hinge lugs, the hinge may also be formed so that the hinge lugs are connected to one another.

What is claimed is:

1. A hinge construction for a movable control surface of an aircraft, said hinge construction comprising:

a pair of spaced hinge lugs connectable to the moveable control surface, each hinge lug including a fastening lug hingeably connected to the aircraft such that rotation of the hinge lugs produces movement of the control surface, each hinge lug further including a connecting lug, wherein said hinge lugs are rotatably connected to the aircraft around an axis offset from said longitudinal axis of said connecting piece, an elongated connecting piece having ends each rotatable connected to a respective said connecting lug such that said connecting piece connects said hinge lugs together and provides relative rotation between said connecting piece and said connecting lugs around a longitudinal axis of said connecting piece, and an actuator connected to said connecting piece to apply a force transversely thereof to produce transverse displacement of said connecting piece and rotation of said fastener lugs around the aircraft to move said control surface while said ends of the connecting piece rotate in said connecting lugs.

2. The hinge construction as claimed in claim 1 wherein said fastening lug and said connecting lug of each hinge lug are adjacent to one another.

3. The hinge construction as claimed in claim 1 wherein said connecting piece has a middle portion which is thicker than end portions of the connecting piece.

4. The hinge construction as claimed in claim 3 wherein said middle portion of said connecting piece comprises a transverse fastening hole, substantially perpendicular in relation to the planar surface of said middle portion, and said actuator comprises a branch-like fastening element which is connected to said fastening hole by means of a fastening pin, thus connecting said actuator to said connecting piece.

5. A connecting piece of a hinge construction for a movable control surface of an aircraft, wherein said hinge construction includes a pair of spaced hinge lugs including fastening lugs and connecting lugs and an actuator, said connecting piece comprising:

an elongated member having ends comprising journals, each rotatably connected to a respective said connecting lug such that said connecting piece connects said hinge lugs together and provides relative rotation between said connecting piece and said connecting lugs around a longitudinal axis of said connecting piece, said elongated member including a middle portion which is thicker than end portions of said member, said middle portion of said connecting piece comprises a transverse fastening hole, substantially perpendicular in relation to the planar surface of said middle portion, said fastening hole connecting said actuator to said connecting piece by means of a fastening pin.

6. The connecting piece of a hinge construction as claimed in claim 5 wherein said elongated member includes at least one recess formed on the upper and lower surfaces of said middle portion.

* * * * *